(12) United States Patent  
Heinkel et al.

(10) Patent No.: US 8,902,231 B2
(45) Date of Patent: Dec. 2, 2014

(54) METHOD AND APPARATUS FOR DISPLAYING GRAPHICAL REPRESENTATIONS OF GRAPH LAYOUTS

(75) Inventors: Ulrich Karl Heinkel, Chemnitz (DE); Axel Schneider, Baiersdorf (DE); Stephan Walter, Greiz (DE)

(73) Assignee: Alcatel Lucent, Boulogne-Billancourt (FR)

( * ) Notice: Subject to any disclaimer, the term of this patent is extended or adjusted under 35 U.S.C. 154(b) by 1782 days.

(21) Appl. No.: 11/551,429

(22) Filed: Oct. 20, 2006

(65) Prior Publication Data

US 2008/0094399 A1    Apr. 24, 2008

(51) Int. Cl.
 *G06T 11/20* (2006.01)
(52) U.S. Cl.
 CPC .................................. *G06T 11/206* (2013.01)
 USPC ........................................................ 345/440
(58) Field of Classification Search
 USPC .............................................. 345/440; 703/2
 See application file for complete search history.

(56) References Cited

U.S. PATENT DOCUMENTS

| | | | |
|---|---|---|---|
| 5,764,239 A * | 6/1998 | Misue et al. | 345/440 |
| 7,237,220 B2 * | 6/2007 | Ogawa et al. | 716/18 |
| 7,486,292 B2 * | 2/2009 | Itoh et al. | 345/440 |
| 2002/0196292 A1 * | 12/2002 | Itoh et al. | 345/853 |
| 2005/0180330 A1 * | 8/2005 | Shapiro | 370/241 |
| 2005/0289499 A1 * | 12/2005 | Ogawa et al. | 716/18 |
| 2006/0235658 A1 * | 10/2006 | Nitta et al. | 703/2 |
| 2006/0290697 A1 * | 12/2006 | Madden et al. | 345/440 |
| 2007/0209025 A1 * | 9/2007 | Jing et al. | 715/968 |

OTHER PUBLICATIONS

T. M. J. Fruchterman and E. M. Reingold, "Graph Drawing by Force-Directed Placement," Software-Practice and Experience, vol. 21(11), 1129-1164 (Nov. 1991).
Emden R. Gasner, "Drawing Graphs with Graphviz,", www.graphriz.com, Nov. 22, 2004.
A. Schneider et al., "Automatic Visualization of Abstract System Specifications,".

* cited by examiner

*Primary Examiner* — Motilewa Good-Johnson
(74) *Attorney, Agent, or Firm* — Wall & Tong LLP (57) ABSTRACT

The invention includes a method and apparatus for displaying a graphical representation of a graph including nodes and edges. A layout of the graph is determined. The layout of the graph is determined by determining respective positions of each of the nodes and edges within the layout. The position of each node is determined using a first model and, optionally, a second force model, wherein the first force model comprises a substantially linear repulsive force in a first region, a substantially exponential repulsive force in a second region, and an attractive force in a third region. In one embodiment, the position of each edge may be determined using the first force model. A graphical representation of the layout is generated. The graphical representation of the layout is displayed to one or more users.

29 Claims, 9 Drawing Sheets

METHOD AND APPARATUS FOR DISPLAYING GRAPHICAL REPRESENTATIONS OF GRAPH LAYOUTS

FIELD OF THE INVENTION

The invention relates to the field of graph layout algorithms and, more specifically, to generating layouts of state machines.

BACKGROUND OF THE INVENTION

Many companies use formal design techniques in system development processes, including techniques for formally specifying system behavior using state machines. In the past, state machines were typically represented using state machine tables and manually drawn state machines. Although such tables are easily stored and processed by computers, and many details may be specified within such tables in a readable format, large tables are not easily understood by design engineers. In an effort to simplify system design processes for design engineers, graph layout and graphical display generation algorithms have been developed which translate a tabular representation of a state machine into a graphical representation of the state machine. There are currently three primary categories of graph layout algorithms: hierarchical layout algorithms, radial layout algorithms, and physical model algorithms.

The hierarchical layout algorithms assign nodes of a graph to discrete levels, and order the nodes of each level to avoid edge-crossing. The radial layout algorithms place a node specified as the center of the layout, and place the remaining nodes on a series of concentric circles around the center node. Disadvantageously, hierarchical and radial layout algorithms only achieve good results if the graph for which the layout is determined has specific properties, such as being acyclic or directed, which cannot be guaranteed for all graphs, and especially for finite state machines. Furthermore, hierarchical and radial layout algorithms cannot pin nodes to specific positions, thereby preventing dynamic updates between tabular and graphical representations of the graph without disturbing portions of the graph which may have been set manually.

The physical model algorithms treat nodes as physical objects influenced by force, and the layout is derived by finding the positions of the nodes. The most common physical model algorithms include the Kamada-Kawai and Frutchermann-Reingold algorithms. Disadvantageously, existing physical model algorithms model nodes as ideal points; however, since nodes typically include information (e.g., respective labels of the nodes) which must be visible in the graphical representation of the layout of the graph, modeling of the nodes as ideal points often results in significant overlaps which render such information unreadable. Although overlaps can be corrected, such corrections require additional processing on the layout of the graph, thereby increasing time and cost associated with generating and displaying the layout of the graph.

SUMMARY OF THE INVENTION

Various deficiencies in the prior art are addressed through the invention of a method and apparatus for displaying a graphical representation of a graph comprising a plurality of nodes and a plurality of edges. A layout of the graph is determined. The layout of the graph is determined by determining a position of each of a plurality of nodes within the layout and determining a position of each of the plurality of edges within the layout. A graphical representation of the layout is generated. The graphical representation of the layout is displayed to one or more users.

In one embodiment of the present invention, the position of each node is determined using a first force model and, optionally, a second force model. The first force model, a repulsive force model, is applied to each pair of nodes in the graph. The first force model includes a substantially linear repulsive force in a first region, a substantially exponential repulsive force in a second region, and an attractive force in a third region. The second force model, an attractive force model, is applied to each pair of nodes in the graph connected by an edge.

In one embodiment of the present invention, the position of each edge is determined using the first force model and, optionally, the second force model. In one such embodiment, the respective positions of edges may be determined by fixing the positions of the nodes within the layout of the graph, splitting each edge into at least two sub-edges, generating, for each edge, a virtual node between each pair of sub-edges formed from the edge, determining a position of each virtual node within the layout of the graph, and splining, for each edge, the sub-edges formed from the edge using the virtual nodes between each pair of sub-edges formed from the edge as control points.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention determines a layout of a graph having a plurality of nodes and a plurality of edges. The layout of the graph is determined by determining respective positions of nodes and respective positions of edges within the layout. In one embodiment, respective positions of the nodes are determined using one or more force models. In one embodiment, respective positions of nodes and respective positions of edges are each determined using one or more force models. A graphical representation of the determined layout of the graph is generated. The graphical representation of the layout of the graph is displayed to one or more users.

In one embodiment, respective positions of the nodes in the layout of are determined using a repulsive force model for each pair of nodes in the graph and an attractive force model for each pair of nodes in the graph that are connected by an edge. The repulsive force model includes a substantially linear repulsive force in a first region, a substantially exponential repulsive force in a second region, and a negative repulsive force (i.e., an attractive force) in a third region. In one embodiment, respective positions of the edges in the layout are determined by fixing the positions of nodes within the layout, splitting each edge into at least two sub-edges, connecting sub-edges using virtual nodes, determining respective positions of the virtual nodes within the layout (using at least one force model), and determining the positions of the edges by splining the sub-edges using the virtual nodes as control points.

Figure 1:
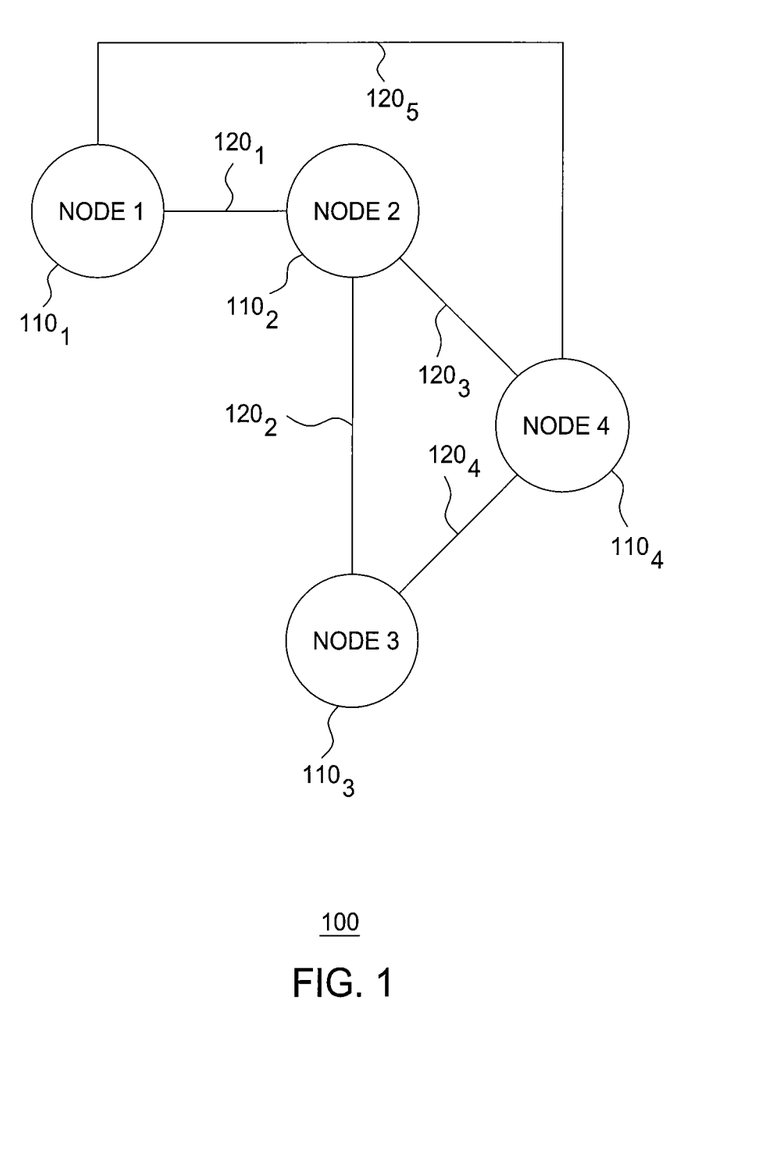
FIG. 1 depicts a graph including a plurality of nodes and a plurality of edges.

FIG. 1 depicts a layout of a graph including a plurality of nodes and a plurality of edges. Specifically, graph 100 includes a plurality of nodes 110$_1$-110$_4$ (collectively, nodes 110) and a plurality of edges 120$_1$-120$_5$ (collectively, edges 120). As depicted in FIG. 1, nodes 110$_1$ and 110$_2$ are connected by edge 120$_1$, nodes 110$_2$ and 110$_3$ are connected by edge 120$_2$, nodes 110$_2$ and 110$_4$ are connected by edge 120$_3$, nodes 110$_3$ and 110$_4$ are connected by edge 120$_4$, and nodes 110$_1$ and 110$_4$ are connected by edge 120$_5$. The other pairs of nodes 110 (illustratively, nodes 110$_1$ and 110$_3$ and nodes 110$_1$ and 110$_4$) are not connected by edges 120. As depicted in FIG. 1, nodes 110 are graphically represented using circles.

As depicted in FIG. 1, graph 100 is a generic graph useful in various applications. In one embodiment, graph 100 may represent a communication network. In this embodiment, nodes 110 may represent communication nodes of the communication network and edges 120 may represent communication links between communication nodes. In one embodiment, graph 100 may represent a state machine. In this embodiment, nodes 100 may represent states of the state machine and edges 120 may represent state transitions between states. Although described with respect to communication networks and state machines, the present invention may be used for generating and displaying layouts of graphs representing various other systems including interconnected combinations of elements, components, modules, and the like, as well as various combinations thereof.

As depicted in FIG. 1, node-related information may be associated with at least a portion of nodes 110 and, optionally, edge-related information may be associated with at least a portion of edges 120. The node-related and edge-related information may include one or more parameters and associated parameter values associated with nodes 110 and edges 120, respectively. For example, node-related information may include node names, node identifiers, and like parameters and associated parameters values, as well as various combinations thereof. Similarly, edge-related information may include edge names, edge identifiers, and like parameters and associated parameters values, as well as various combinations thereof. As depicted in FIG. 1, in one embodiment, at least a portion of the information associated with a node may be displayed within the node.

In one embodiment, node-related information and edge-related information (e.g., parameters and associated parameter values) associated with nodes and edges of a graph, respectively, may vary depending on the application of the graph (i.e., depending on that which the graph is intended to represent). For example, information associated with nodes and edges of a graph representative of a communication network (e.g., where nodes include information such as communication node identifiers and edges include information such as communication link identifiers) may differ from information associated with nodes and edges of a graph representative of a state machine (e.g., where nodes include information such as state identifiers and edges include information such as state transition triggers).

Although primarily depicted and described with respect to a specific layout of a graph including a specific number of nodes and a specific number of edges interconnecting the nodes in a specific configuration, the numbers and configurations of nodes and edges merely represent an exemplary graph. The present invention may be used for generating and displaying graphs including fewer or more nodes and fewer or more edges interconnected in various other configurations. Furthermore, although primarily depicted and described with respect to specific node-related information, various other node-related and edge-related information may be associated with nodes and edges of graphs, as well as displayed as part of the graphical representations of such graphs.

Figure 2:
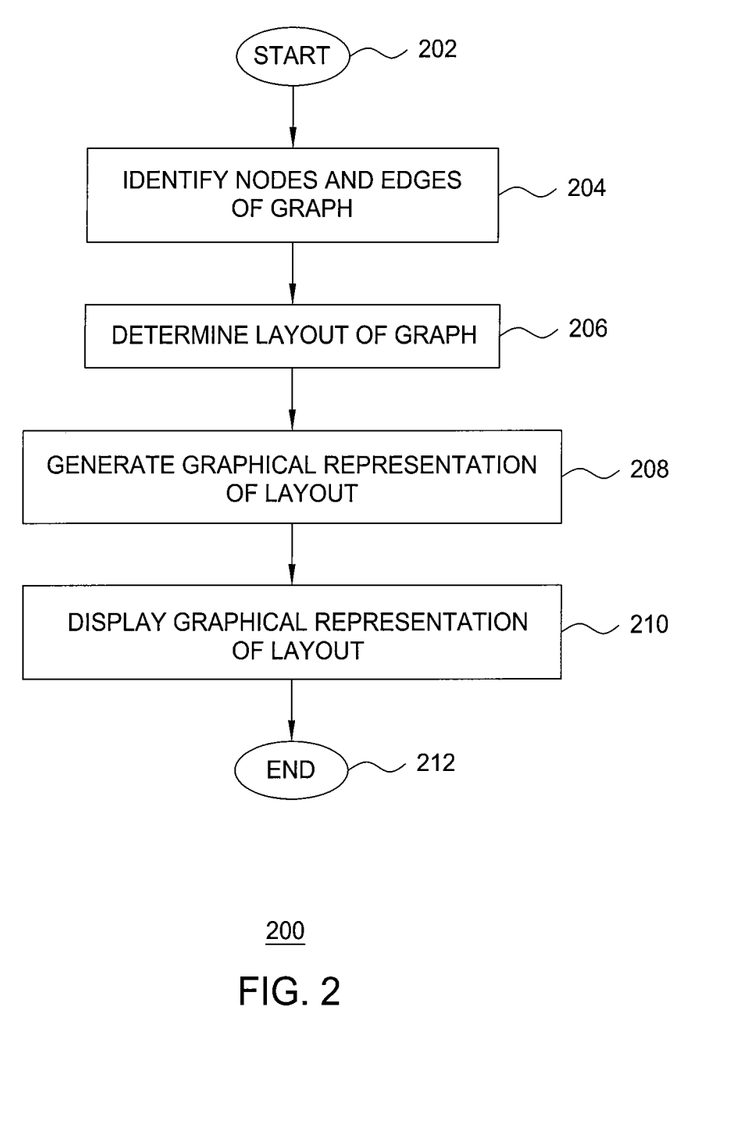
FIG. 2 depicts a method according to one embodiment of the present invention.

FIG. 2 depicts a method according to one embodiment of the present invention. Specifically, method 200 includes a method for generating a layout of a graph, generating a graphical representation of the generated layout of the graph, and displaying the graphical representation of the generated layout of the graph. Although primarily depicted and described herein as being performed serially, at least a portion of the steps of method 200 may be performed contemporaneously, or in a different order than presented in FIG. 2. The method 200 begins at step 202 and proceeds to step 204.

At step 204, nodes and edges of a graph are identified. The identification of nodes and edges of a graph includes identifying connectivity information indicative of associations between nodes and edges. In one embodiment, nodes and edges of a graph may be identified from a tabular representation of the graph. In one embodiment, nodes and edges of a graph may be identified from one or more data objects, data structures, data functions, and the like, as well as various combinations thereof. Although described with respect to specific sources of information from which nodes and edges of a graph may be identified, in other embodiments, nodes and edges of a graph may be identified using various other sources of information, as well as various combinations thereof.

At step 206, a layout of the graph is determined. The layout of the graph is determined using the identified nodes and edges of the graph. The layout of the graph is determined by determining respective positions of nodes within the layout of the graph and respective positions of edges within the layout of the graph. The positions of the nodes may be determined using one or more force models. An exemplary method for determining positions of nodes within a layout of a graph is depicted and described herein with respect to FIG. 3. The positions of the edges may be set according to the positions of the nodes, determined using one or more algorithms, including algorithms using one or more force models, and the like, as well as various combinations thereof. An exemplary method for determining positions of edges within a layout of a graph is depicted and described herein with respect to FIG. 6.

At step 208, a graphical representation of the layout of the graph is generated. In one embodiment, the graphical representation of the layout of the graph may be defined using one or more data structures adapted for defining a graphical representation. In one embodiment, the graphical representation of the layout may be stored in an XML format. In one such embodiment, the XML format may be a customized XML tree structure. At step 210, the graphical representation of the layout of the graph is displayed. In one embodiment, the graphical representation of the layout of the graph may be displayed to one or more users on a display device (e.g., on a computer monitor). In one embodiment, the graphical representation of the layout of the graph may be displayed to one or more users on one or more printed sheets. At step 212, method 200 ends.

Figure 3:
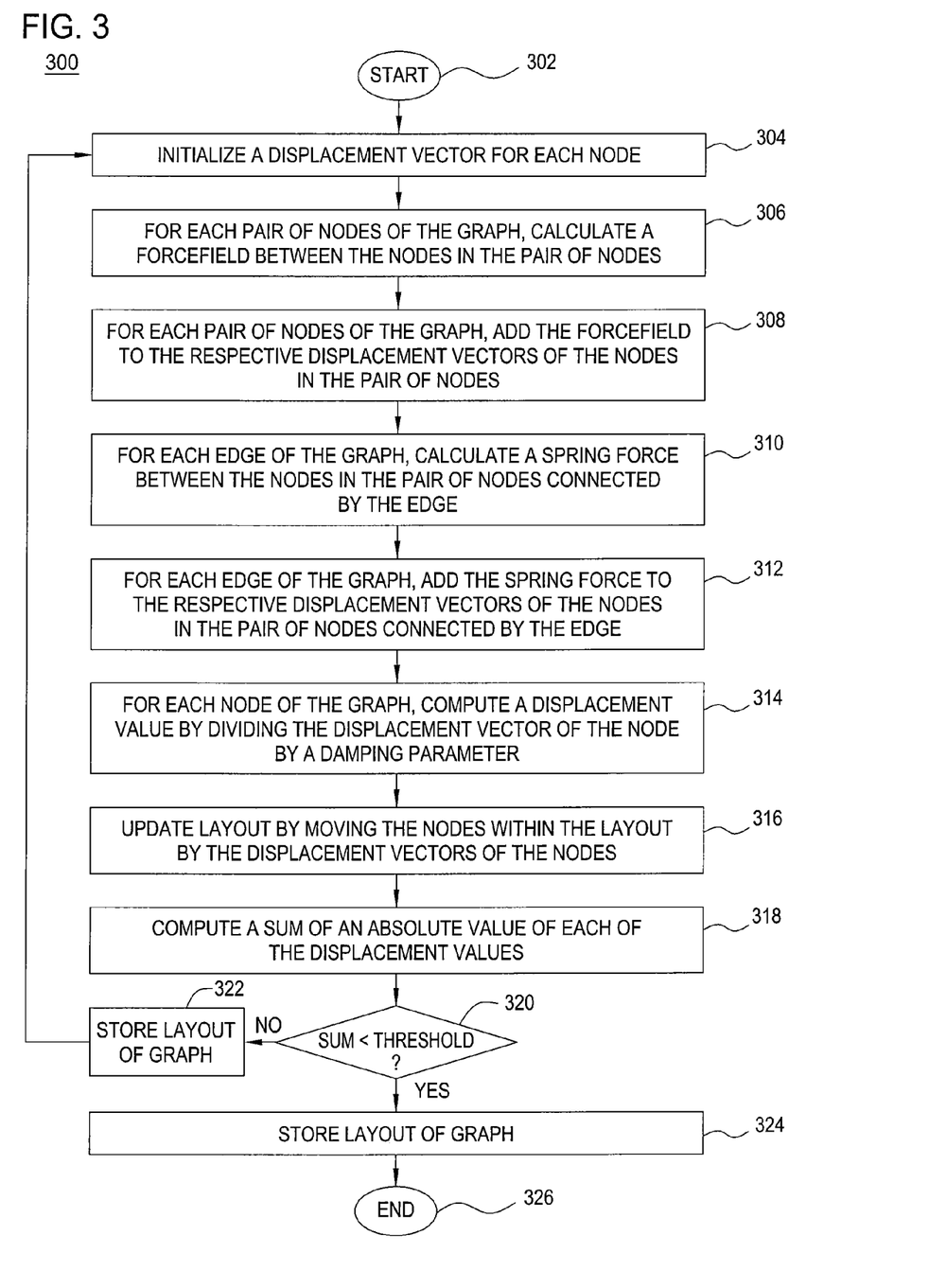
FIG. 3 depicts a method of determining positions of nodes within a layout of a graph according to one embodiment of the present invention.

FIG. 3 depicts a method of determining positions of nodes within a layout of a graph according to one embodiment of the present invention. Specifically, method 300 includes a method of determining positions of nodes within a layout of a graph using a repulsive force model for each pair of nodes in the graph and an attractive force model for each pair of nodes connected by an edge. As described with respect to FIG. 2, nodes and edges of the graph for which the layout is generated, as well as information associated with connectivity of the nodes by the edges, is identified for use in generating the layout of the graph. Although primarily depicted and described herein as being performed serially, at least a portion of the steps of method 300 may be performed contemporaneously, or in a different order than presented in FIG. 3. The method 300 begins at step 302 and proceeds to step 304.

At step 304, a displacement vector is initialized for each node in the graph. In one embodiment, the displacement vectors are initialized to zero. The displacement vectors associated with the nodes of the graph are used for summing various forces computed for different pairs of nodes in the graph. The displacement vectors associated with the nodes of the graph are used for iteratively moving nodes within the layout of the graph until the nodes reach desired positions within the layout of the graph. Although primarily described with respect to displacement vectors, various other constructs may be used for determining displacement of nodes in the graph.

At step 306, for each pair of nodes in the graph (including pairs of nodes connected by edges and pairs of nodes not connected by edges), a forcefield between the nodes in the pair of nodes is calculated. At step 308, for each pair of nodes in the graph, the forcefield calculated for the pair of nodes is added to the respective displacement vectors of the nodes in the pair of nodes. At step 310, for each edge of the graph, a spring force (i.e., an attractive force) between the nodes in the pair of nodes is calculated. At step 312, for each edge of the graph, the spring force calculated for the edge is added to the respective displacement vectors of the nodes in the pair of nodes connected by the edge.

In one embodiment, the spring force is determined according to a force model. In one embodiment, the spring force (denoted as $F_s$) is determined according to a force model having a linear characteristic curve of the form: $F_s=K(x-m)$, where K is a spring constant, x is the current length of the spring (i.e., the current length of the edge between the nodes), and m is the natural length of the spring if it is not expanded. Although primarily described with respect to a specific force model having a specific characteristic curve, in other embodiments, the spring force (attractive force) between nodes connected by an edge may be determined using one or more other force models including one or more spring models, other attractive force models, and the like, as well as various combinations thereof.

In one embodiment, the forcefield is determined according to a force model. In one embodiment, the forcefield is determined according to a force model having a customized exponential curve. In one embodiment, the force model having the customized exponential curve includes at least one region having a positive repulsive force and at least one region having a negative repulsive force (i.e., an attractive force). The force model having the customized exponential curve is depicted and described herein with respect to FIG. 4.

At step 314, for each node of the graph, a displacement value is computed by dividing the displacement vector of the node by a damping parameter. The damping parameter is used to inhibit oscillation in the movements of nodes within the layout. In one embodiment, the damping parameter is a constant value. In one embodiment, the damping parameter is a function of the number of iterations previously executed (e.g., damping is increased as the number of previously executed iterations increases). In one embodiment, the damping parameter is a function of the number of nodes (denoted as n) and the number of edges (denoted as e) in the graph. In one such embodiment, the damping parameter (denoted as d) may be computed as: $d=2(e+1)/n$.

At step 316, the layout of the graph is updated by moving the nodes within the layout by the displacement vectors of the nodes. In one embodiment, in which the first iteration of the layout is initialized prior to processing of method 300, for the first iteration, the initialized layout is updated using the displacement vectors of the nodes. In one embodiment, in which the first iteration of the layout is not initialized prior to processing of method 300, for the first iteration, the initial layout is generated using the displacement vectors of the nodes. The movement of nodes within a layout using displacement vectors of the nodes may be better understood with respect to FIG. 5.

At step 318, a sum of the absolute values of the respective displacement values is computed. At step 320, a determination is made as to whether the sum of the absolute values of the respective displacement values is less than a threshold. In one embodiment, since displacement of nodes within the layout is determined using forces, the threshold may represent a minimum energy of the system below which the layout is deemed to be stable. If the sum of the absolute values of the respective displacement values is not less than the threshold, method 300 proceeds to step 322, at which point the current layout of the graph is stored. From step 322, method 300 returns to step 304, at which point the next iteration begins. If the sum of the absolute values of the respective displacement values is less than the threshold, method 300 proceeds to step 324.

At step 324, the generated layout of the graph is stored for use in generating and displaying a graphical representation of the generated layout of the graph. In one embodiment, the generated layout of the graph may be stored using one or more data structures adapted for storing information defining a graphical representation. An exemplary graphical display of the graphical representation of a layout is depicted and described herein with respect to FIG. 8. At step 326, method 300 ends.

Figure 4:
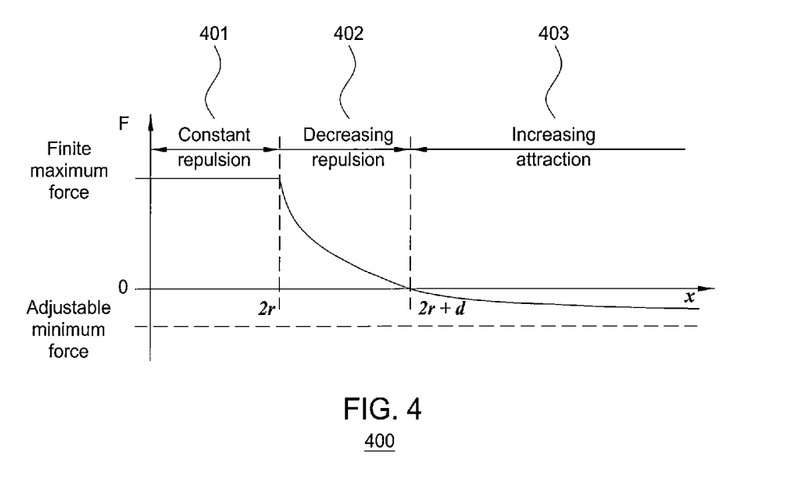
FIG. 4 depicts a force model according to one embodiment of the present invention.

FIG. 4 depicts a force model according to one embodiment of the present invention. As depicted in FIG. 4, force model 400 quantifies distance between nodes in a pair of nodes (denoted as x) along the x-axis and quantifies repulsive force (denoted as $F_R$) along the y-axis. Specifically, force model 400, which is applied to each pair of nodes in a graph for determining forcefield to be applied to each node in the pair of nodes, includes a customized exponential curve 410 which specifies values of force (F) over a range of values of distance between nodes in a pair of nodes (x). As depicted in FIG. 4, force model 400 includes a first region 401, a second region 402, and a third region 403.

As depicted in FIG. 4, within first region 401, in which $0 \le x \le 2r$ (where r is the radius of the nodes in the graph), customized exponential curve 410 is linear. In one embodiment, as depicted in FIG. 4, within first region 401, customized exponential curve 410 may be constant, having a maximum force (denoted as $F_{max}$). The maximum force $F_{max}$ in first region 401 is a repulsive force. In other words, rather than nodes being modeled as ideal points, nodes are modeled as electrically charged plates, such that, if two nodes overlap, those overlapping nodes repel each other with a maximum force ($F_{max}$).

As depicted in FIG. 4, within second region 402, in which 2r≤x≤2r+d (where r is the radius of the nodes in the graph and d is and adjustable length parameter), customized exponential curve 410 is exponential. In one embodiment, as depicted in FIG. 4, within second region 402, customized exponential curve 410 decreases exponentially from the maximum force $F_{max}$ (at x=2r) to zero (at x=2r+d). The force F in second region 402 is a repulsive force which decreases exponentially as the distance between nodes in a node pair (x) increases.

As depicted in FIG. 4, within third region 403, in which 2r+d≤x, customized exponential curve 410 is exponential. In one embodiment, as depicted in FIG. 4, within third region 403, customized exponential curve 410 decreases exponentially from zero (at x=2r+d), approaching a minimum force $F_{min}$ (as x approaches 2r+d). In one embodiment, minimum force $F_{min}$ is adjustable. The force F in third region 403 is a negative repulsive force which decreases exponentially as the distance between nodes in a node pair (x) increases (i.e., force F in third region 403 is an increasing attractive force as the distance between nodes in a node pair (x) increases). In other words, third region 403 ensures that nodes separated by large distances (relative to the radii of the nodes) are attracted by the forcefield.

Since, according to the force model, forces cannot be infinite (even at very small distances between nodes, use of the force model for determining positions of nodes in a layout of a graph does not require "cooling" (i.e., limiting the absolute values of the displacement vectors to a maximum, or, in other words, limiting the maximum change in positions of the nodes from iteration to iteration). Since, according to the force model, repulsive forces on nodes become attractive for distances between nodes which exceed 2r+d (i.e., 2r+d≤x), use of the force model for determining positions of nodes in a layout of a graph does not stretch large graphs. The customized exponential curve 410 of force model 400 may be represented by the following equation:

$$F = \begin{cases} F_{max} & \text{in } x < 2r \\ (F_{max} - F_{min}) * \exp\left(\frac{(x-2r)*\ln\left(-\frac{F_{min}}{F_{max}-F_{min}}\right)}{l+2r}\right) - F_{min} & \text{else} \end{cases}$$

Figure 5:
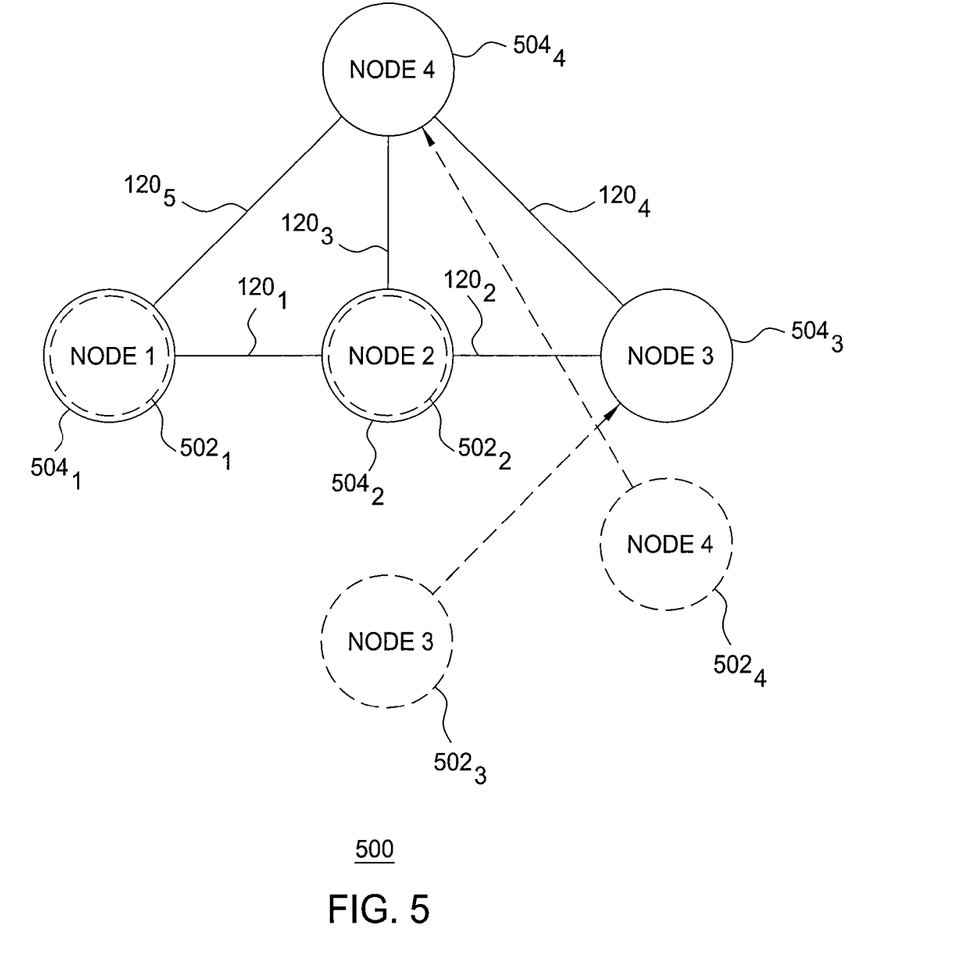
FIG. 5 depicts movement of nodes within the graph of FIG. 1, using displacement vectors of nodes of the graph, to form a layout of the graph of FIG. 1.

FIG. 5 depicts movement of nodes within the graph of FIG. 1, using displacement vectors of nodes of the graph, to form a layout of the graph of FIG. 1. Specifically, FIG. 5 depicts movements of nodes 110 within a layout of graph 100 depicted and described herein with respect to FIG. 1. Specifically, layout 500 of graph 100 depicts original positions $502_1$-$502_4$ and updated positions $504_1$-$504_4$ of nodes $110_1$-$110_4$, respectively. As depicted in FIG. 5, original positions $502_1$ and $502_2$ of nodes $110_1$ and $110_2$, respectively, remain unchanged (i.e., updated positions $504_1$ and $504_2$ overlay original positions $502_1$ and $502_2$). As depicted in FIG. 5, original positions $502_3$ and $502_4$ of nodes $110_3$ and $110_4$, respectively, change according to displacement vectors computed for nodes $110_3$ and $110_4$ (i.e., updated positions $504_3$ and $504_4$ are different than original positions $502_3$ and $502_4$).

As described herein, movement of nodes $110_1$-$110_4$ from original positions $502_1$-$502_4$ to updated positions $504_1$-$504_4$, respectively, is determined using respective displacement vectors determined for nodes $110_1$-$110_4$. In one embodiment, movement of nodes 110 from original positions 502 to updated positions 504, respectively, is determined using respective displacement vectors determined for nodes 110 using a first model for each pair of nodes in the graph and a second model for each pair of nodes in the graph connected by an edge. Following a determination that nodes 110 of graph 100 of FIG. 1 have reached optimal positions within the layout of graph, a graphical representation of the layout of graph 100 of FIG. 1 is determined, and the graphical representation of the layout of the graph is displayed, as depicted and described herein with respect to FIG. 8.

Figure 6:
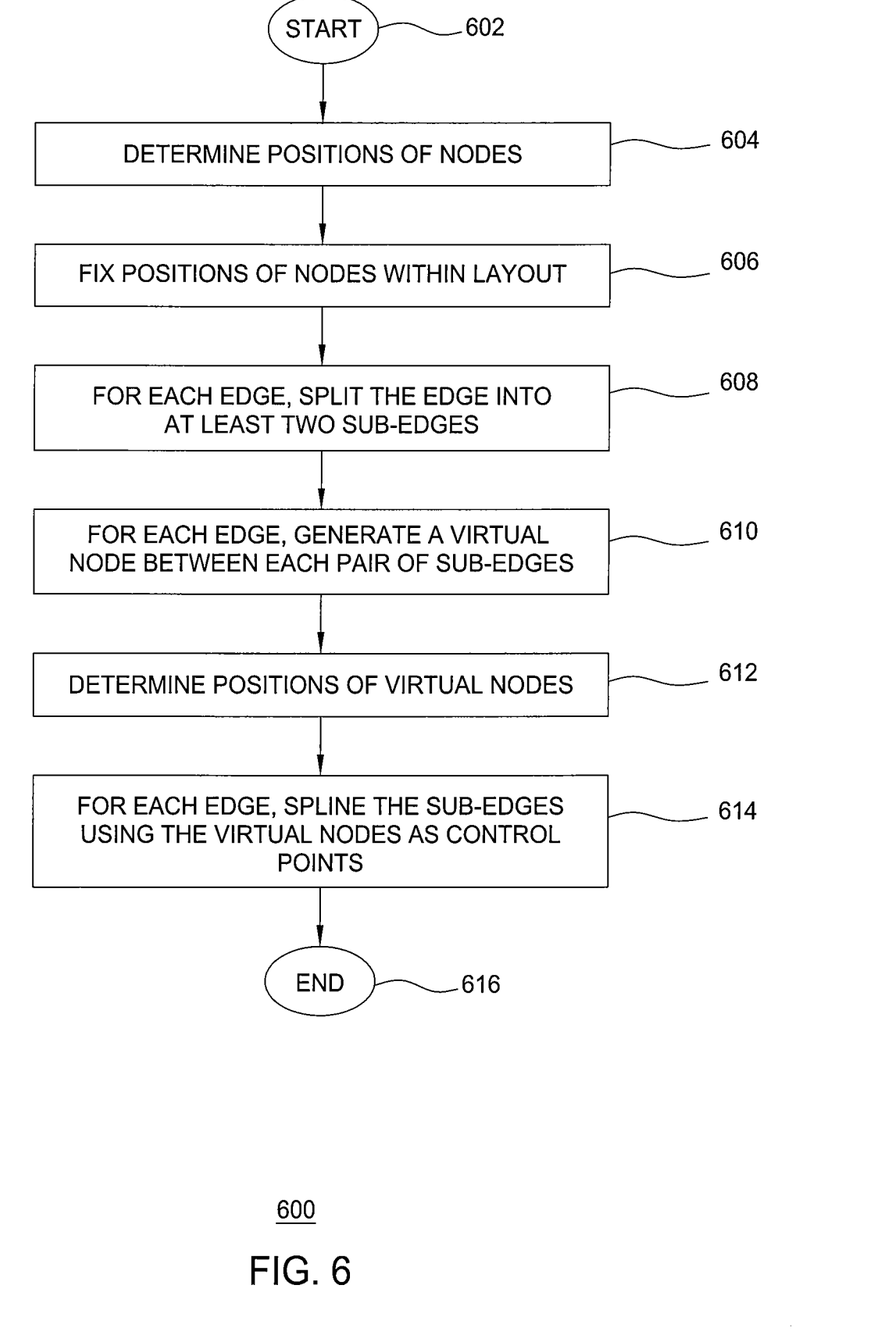
FIG. 6 depicts a method of determining positions of edges within a layout of a graph according to one embodiment of the present invention.

FIG. 6 depicts a method of determining positions of edges within a layout of a graph according to one embodiment of the present invention. Specifically, method 600 includes a method of determining positions of edges within a layout of a graph using the method for determining respective positions of the nodes within the layout of the graph, as depicted and described herein with respect to FIG. 3. Although primarily depicted and described herein as being performed serially, at least a portion of the steps of method 600 may be performed contemporaneously, or in a different order than presented in FIG. 6. The method 600 begins at step 602 and proceeds to step 604.

At step 604, positions of nodes within the layout of the graph are determined. In one embodiment, positions of nodes within the layout of the graph may be determined using the method for determining respective positions of the nodes within the layout of the graph, as depicted and described herein with respect to FIG. 3. At step 606, the positions of the nodes within the graph are fixed (i.e., the positions of the nodes within the layout of the graph are set such that the nodes exert forces on the virtual nodes but the positions of the nodes within the layout do not change when method 300 is re-executed to determine respective positions of edges within the layout of the graph).

At step 608, for each edge in the graph, the edge is split into at least two sub-edges. In one embodiment, an edge may be split such that resultant sub-edges are of equal length. In another embodiment, an edge may be split such that at least a portion of the resultant sub-edges are of unequal length. At step 610, for each edge in the graph, a virtual node is generated between each pair of sub-edges. For example, if an edge is split into two sub-edges, one virtual node is generated between the sub-edges. In one embodiment, the virtual nodes may have a different radius than nodes of the graph. The splitting of edges into sub-edges and associated generation of virtual nodes between resultant pairs of sub-edges may be better understood with respect to FIG. 7.

At step 612, positions of virtual nodes within the layout of the graph are determined. In one embodiment, positions of virtual nodes within the layout of the graph may be determined using the method for determining positions of the nodes within the layout of the graph, as depicted and described herein with respect to FIG. 3. Since the positions of nodes within the layout of the graph have been fixed, nodes of the graph do not move within the layout of the graph as virtual nodes move within the layout of the graph. At step 614, for each edge, the sub-edges are splined using the virtual nodes as control points. The splined sub-edges reform the edges of the graph such that the edges are optimally positioned within the layout of the graph. The sub-edges may be splined using one or more known splining algorithms. At step 616, method 600 ends.

Figure 7:
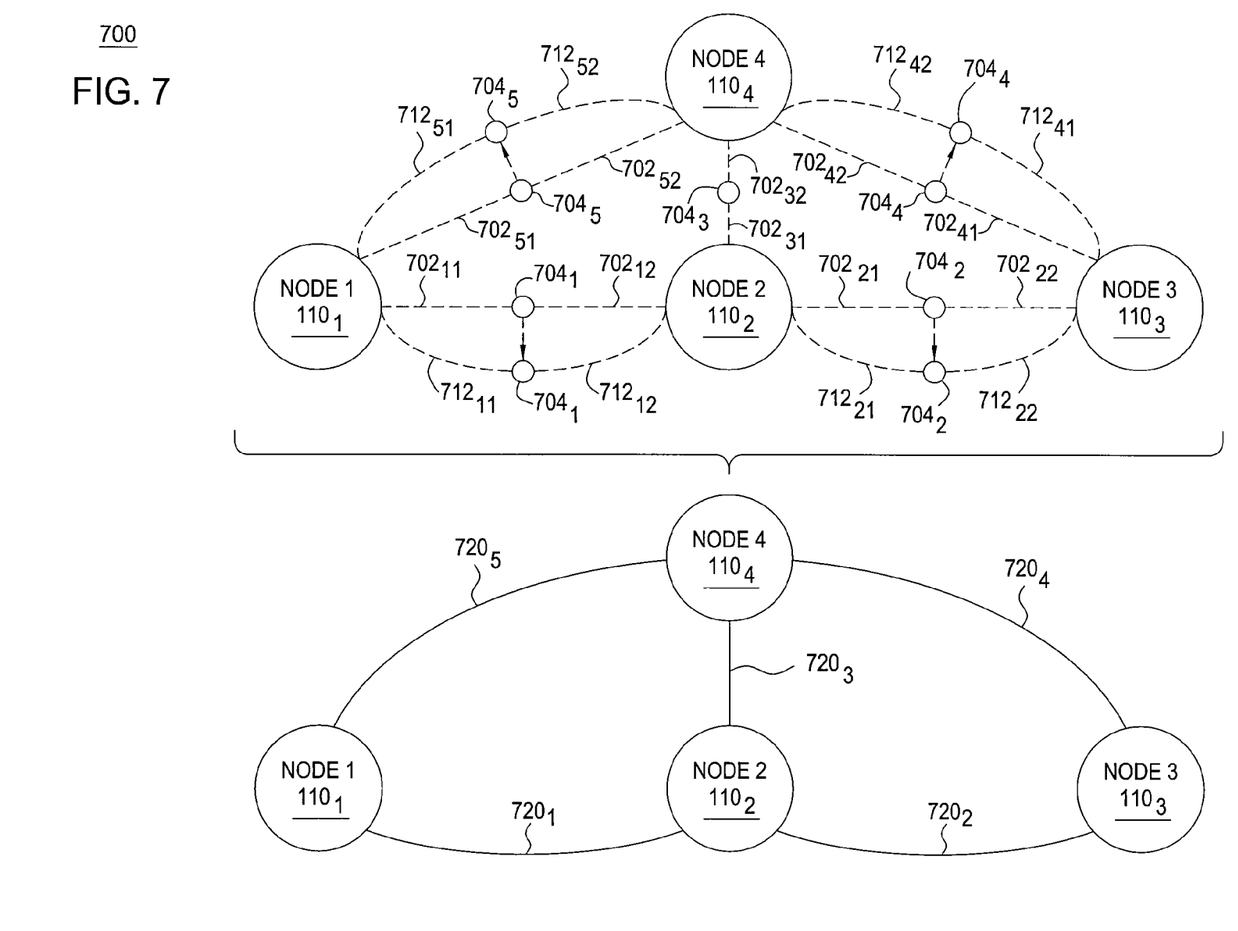
FIG. 7 depicts splitting of edges of the graph of FIG. 5 to determine positions of the edges within a layout of the graph of FIG. 5.

FIG. 7 depicts splitting of edges of the graph of FIG. 5 to determine positions of the edges within a layout of the graph of FIG. 5. Specifically, graph 700 of FIG. 1 includes nodes 110 in respective positions 504, as depicted and described herein with respect to FIG. 5. As depicted in FIG. 7, edges $120_1$-$120_5$ are each split to form respective pairs of sub-edges $702_{11}$ and $702_{12}$ (collectively, sub-edge pair $702_1$), $702_{21}$ and $702_{22}$ (collectively, sub-edge pair $702_2$), $702_{31}$ and $702_{32}$ (collectively, sub-edge pair $702_3$), $702_{41}$ and $702_{42}$ (collectively, sub-edge pair $702_4$), $702_{51}$ and $702_{52}$ (collectively, sub-edge pair $702_5$). The pairs of sub-edges $702_1$-$702_5$ are linked by virtual nodes $704_1$-$704_5$ (collectively, virtual nodes 704), respectively.

As depicted in FIG. 7, forces are exerted on each of the virtual nodes 704 by other virtual nodes 704, as well as by nodes 110. For example, with respect to virtual node $704_1$ between sub-edges $702_{11}$ and $702_{12}$, using method 300 depicted and described herein with respect to FIG. 3, repulsive forces are exerted on virtual node $704_1$ by nodes $110_1$-$110_4$ and by virtual nodes $704_2$-$704_5$ (i.e., using a repulsive force model), and, furthermore, since virtual node $704_1$ is connected to nodes $110_1$ and $110_2$ via sub-edges $702_{11}$ and $702_{12}$, respectively, attractive forces are exerted virtual node $704_1$ by nodes $110_1$-$110_2$ (i.e., using an attractive force model). Similar repulsive and attractive forces are exerted on virtual nodes $704_2$-$704_5$.

As depicted in FIG. 7, as a result of forces exerted on virtual nodes 704 (using the method for determining respective positions of the nodes within the layout of the graph, as depicted and described herein with respect to FIG. 3), at least a portion of virtual nodes 704 move within the layout of graph 700. Specifically, as depicted in FIG. 7, virtual node $704_1$ moves away from node $110_4$, virtual node $704_2$ moves away from node $110_4$, virtual node $704_4$ moves away from node $110_2$, and virtual node $704_5$ moves away from node $110_2$. The virtual node $704_3$ does not change position within the layout of the graph (i.e., the net repulsive and attractive forces exerted on virtual node $704_3$ is zero).

As depicted in FIG. 7, positions of sub-edges $702_1$, $702_2$, $702_4$, and $702_5$ within the layout of graph 700 are modified by respective movements of virtual nodes $704_1$, $704_2$, $704_4$, and $704_5$ (i.e., sub-edges $702_{11}$ and $702_{12}$ move to respective positions depicted by sub-edges $712_{11}$ and $712_{12}$, sub-edges $702_{21}$ and $702_{22}$ move to respective positions depicted by sub-edges $712_{21}$ and $712_{22}$, sub-edges $702_{41}$ and $702_{42}$ move to respective positions depicted by sub-edges $712_{41}$ and $712_{42}$, and sub-edges $702_{51}$ and $702_{52}$ move to respective positions depicted by sub-edges $712_{51}$ and $712_{52}$, respectively. Since sub-edges 702 are formed from edges 120, positions of edges $120_1$, $120_2$, $120_4$, and $120_5$ are modified by respective movements of virtual nodes $704_1$, $704_2$, $704_4$, and $704_5$.

As depicted in FIG. 7, positions of edges 120 are determined by splining sub-edges 702 using nodes 704 (at least a portion of which have been moved to updated positions within the layout) as control points. More specifically, splining of sub-edges $712_{11}$ and $712_{12}$ using virtual node $704_1$ as a control point results in the modified position of edge $120_1$ (depicted as arc $720_1$), splining of sub-edges $712_{21}$ and $712_{22}$ using virtual node $704_2$ as a control point results in the modified position of edge $120_2$ (depicted as arc $720_2$), splining of sub-edges $712_{31}$ and $712_{32}$ using virtual node $704_3$ as a control point results in the position of edge $120_1$ (depicted as line $720_3$), splining of sub-edges $712_{41}$ and $712_{42}$ using virtual node $704_4$ as a control point results in the modified position of edge $120_4$ (depicted as arc $720_4$), and splining of sub-edges $712_{51}$ and $712_{52}$ using virtual node $704_5$ as a control point results in the modified position of edge $120_5$ (depicted as arc $720_5$).

Figure 8:
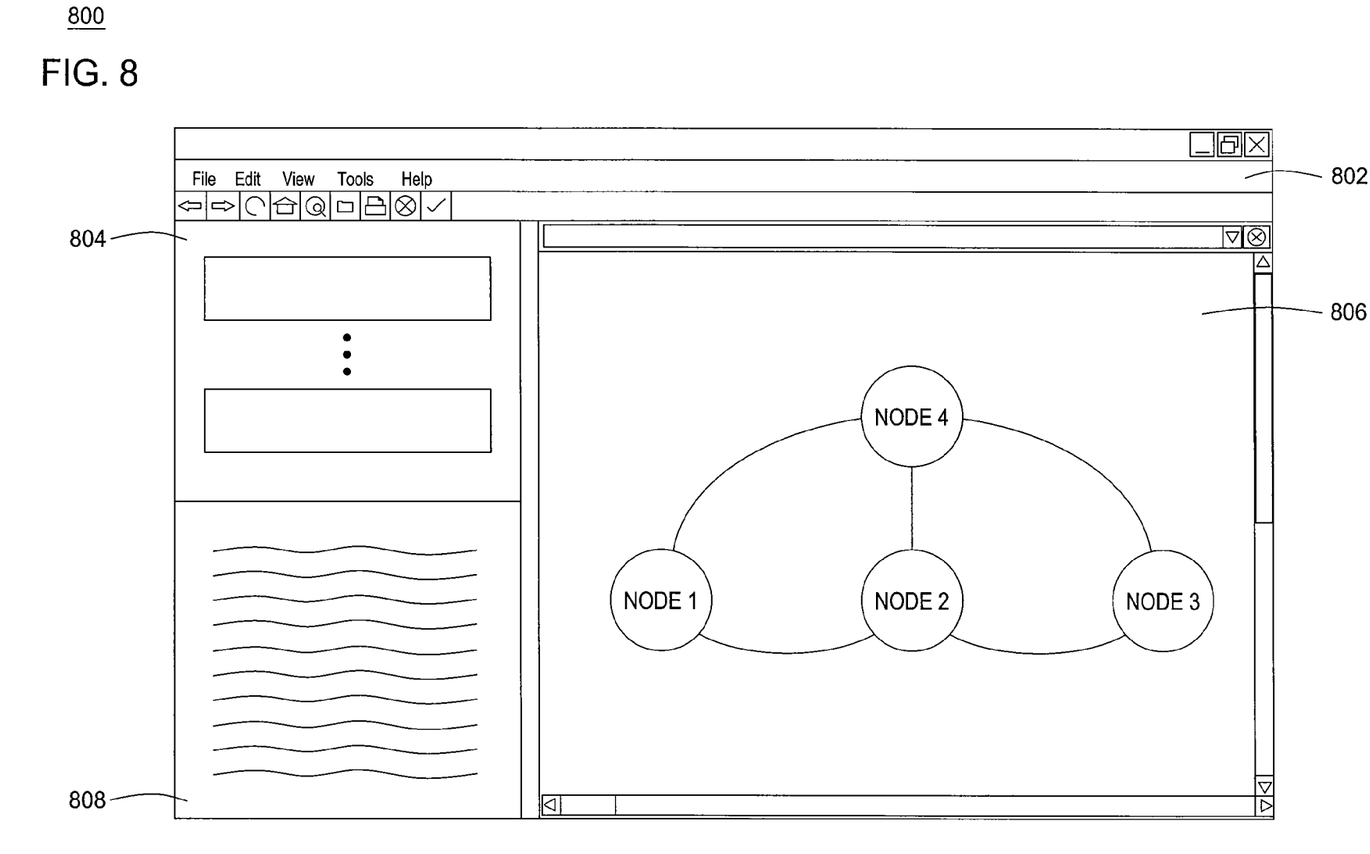
FIG. 8 depicts a graphical display including a graphical representation of the layout of the graph of FIG. 7.

As described herein, following a determination that nodes 110 of graph 100 of FIG. 1 have reached optimal positions within the layout of the graph (as shown in the layout of graph 500 of FIG. 5), and, optionally, following a determination that edges 120 of graph 500 of FIG. 5 have reached optimal positions within the layout of the graph (as shown in the layout of graph 700 of FIG. 7), a graphical representation of the layout of the graph is determined, and the graphical representation of the layout of the graph is displayed, as depicted and described herein with respect to FIG. 8.

FIG. 8 depicts a graphical display including a graphical representation of the layout of the graph of FIG. 7. Specifically, graphical display 800 includes a menu portion 802, a control portion 804, a graph layout display portion 806, and an information display portion 808. Although primarily depicted and described with respect to a graphical display including specific numbers of display portions arranged in a specific configuration, various other numbers and configurations of display portions may be used for performing functions of the present invention. The present invention is not limited by the implementation of the graphical display on which layouts of associated graphs may be displayed in accordance with various embodiments of the present invention.

The menu portion 802 includes a plurality buttons (illustratively, FILE, EDIT, VIEW, TOOLS, and HELP) which, when selected, produce drop-down menus including options for performing various functions associated with the present invention. The control portion 804 includes a plurality of buttons adapted for performing various functions associated with the present invention. For example, menu portion 802 and control portion 804 may include options for manually selecting nodes and edges for inclusion in a graph, displaying nodes and edges, displaying information associated with nodes and edges, generating a layout of a graph (including determining the layout and generating a graphical display of the determined layout), and like functions, as well as various combinations thereof.

The graph layout display portion 806 displays a graphical representation of a layout of a graph (illustratively, a combination of the nodes of layout 500 and the edges of layout 700 depicted and described with respect to FIG. 5 and FIG. 7, respectively) determined according to the present invention. In one embodiment, at least a portion of the nodes and edges of the graphical representation of the layout of the graph may be selectable for performing various actions, such as dragging nodes and/or edges within graph layout display portion 806 in order to change the layout of the graph, displaying additional information (e.g., parameters and associated parameter values) associated with selected nodes and edges, and the like, as well as various combinations thereof.

The information display portion 808 displays various information associated with one or more of graphs, nodes, edges, layouts of graphs, iterations of layouts of graphs, and the like, as well as various combinations thereof. For example, information display portion may display one or more attributes and associated attribute values associated with one or more nodes and/or edges, non-graphical representations (e.g., using tables, XML data structures, proprietary data structures, and the like, as well as various combinations thereof) of a layout or a portion of a layout (which may or may not be concurrently displayed in graph layout display portion 806), and the like, as well as various combinations thereof. In one embodiment, at least a portion of the information displayed in information display portion 808 may be manually changed by a user.

In one embodiment, depending on the information changed by the user (e.g., changing positions of nodes within graph layout display portion 806, changing information within information display portion 808, and the like), one or more associated tables, data objects, data structures, data functions, and the like, as well as various combinations thereof, may be changed to reflect the change(s) made by the user. For example, a change to a position of a node within a layout of a graph may be propagated to one or more tabular representations of the layout of the graph, one or more data objects, data structures, and data functions representative of the graphical representation of the layout of the graph, and the like, as well as various combinations thereof.

Figure 9:
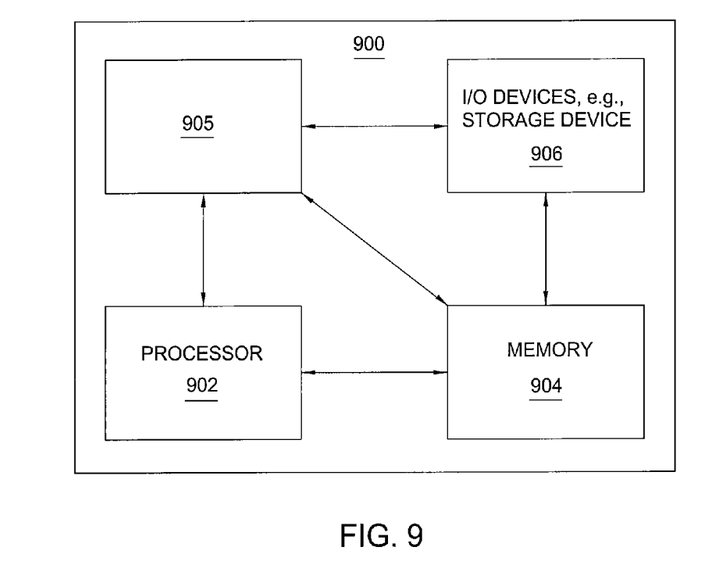
FIG. 9 depicts a high-level block diagram of a general-purpose computer suitable for use in performing at least a portion of the functions described herein.

FIG. 9 depicts a high-level block diagram of a general-purpose computer suitable for use in performing the functions described herein. As depicted in FIG. 9, system 900 includes a processor element 902 (e.g., a CPU), a memory 904, e.g., random access memory (RAM) and/or read only memory (ROM), a layout determination module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present layout determination module or process 905 can be loaded into memory 904 and executed by processor 902 to implement the functions as discussed above. As such, layout determination process 905 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for generating a graphical representation of a graph comprising a plurality of nodes and a plurality of edges, comprising:
    using a processor to perform steps comprising:
        determining, for each of the nodes of the graph, a position of the node within a layout of the graph;
            wherein the positions of the nodes within the layout of the graph are determined using a force model comprising a substantially linear repulsive force in a first region, a substantially exponential repulsive force in a second region, and an attractive force in a third region;
            wherein, for each of a plurality of pairs of nodes of the graph for which the force model is used, the region of the force model that is used is determined using a distance between the nodes in the pair of nodes; and
        generating a graphical representation of the graph using the determined positions of the nodes within the layout of the graph.

2. The method of claim 1, wherein the force model is a first force model, wherein the positions of the nodes within the layout of the graph are determined using the first force model and a second force model, wherein the second force model comprises a substantially linear attractive force.

3. The method of claim 2, wherein each of the nodes of the graph has a vector associated therewith, wherein determining the positions of the within the layout of the graph comprises:
    for each pair of nodes in the graph, determining a first force for the node pair using the first force model, and adding the first force to the respective vectors associated with the nodes in the node pair;
    for each pair of nodes in the graph connected by an edge of the graph, determining a second force for the node pair using the second force model, and adding the second force to the respective vectors associated with the nodes in the node pair connected by the edge; and
    determining the positions of the nodes using the respective vectors associated with the nodes.

4. The method of claim 3, wherein determining the positions of the nodes using the respective vectors associated with the nodes comprises:
    identifying, for each of the nodes, a previous position associated with the node;
    determining, for each of the nodes, a displacement value for the node using the respective vector for the node; and
    determining the positions of the nodes by updating the previous positions of the nodes using the respective displacement values of the nodes.

5. The method of claim 4, wherein determining the displacement values for the nodes comprises:
    dividing, for each of the nodes, the vector associated with the node by a damping parameter.

6. The method of claim 4, further comprising:
    computing an absolute value of each of the displacement values of the nodes;
    computing a summation of the absolute values of the displacement values of the nodes; and
    determining, using the summation of the absolute values, whether the positions of the nodes comprise final positions of the nodes within the layout.

7. The method of claim 1, wherein the substantially linear repulsive force in the first region comprises a substantially constant repulsive force, wherein the substantially exponential repulsive force in the second region decreases with an increase in distance between nodes, wherein the attractive force in the third region increases with an increase in distance between nodes.

8. The method of claim 1, wherein the region of the force model to be used for a pair of nodes is selected according to a distance x between respective centers of the nodes in the pair of nodes.

9. The method of claim 8, wherein the first region is used when the distance x is in a first range $0<x<2r$, wherein the second region is used when the distance x is in a second range $2r<x<2r+d$, wherein the third region is used when the distance x is in a third range $2r+d<x$, wherein r is a radius of each node in the pair of nodes, wherein d is an adjustable parameter.

10. The method of claim 1, further comprising:
    displaying the graphical representation of the layout of the graph on a display device.

11. The method of claim 1, further comprising:
    determining, for each edge of the graph, a position of the edge within the layout of the graph.

12. The method of claim 11, wherein determining the positions of the edges of the graph, comprises:
    fixing the positions of the nodes within the layout of the graph;
    splitting each edge into at least two sub-edges;

generating, for each edge, a virtual node between each pair of sub-edges formed from the edge;
determining a position of each virtual node within the layout of the graph; and
splining, for each edge, the sub-edges formed from the edge using the virtual nodes between each pair of sub-edges formed from the edge.

13. The method of claim 12, wherein the position of each virtual node is determined using the force model.

14. The method of claim 12, wherein the force model is a first force model, wherein a second force model comprises a substantially linear attractive force, wherein each virtual node has a vector associated therewith, wherein determining the positions of the virtual nodes comprises:
for each pair of nodes including at least one virtual node, determining a first force using the first force model, and adding the first force to the at least one vector associated with the respective at least one virtual node of the node pair;
determining, for each of the sub-edges, a second force using the second force model, and adding the second force to the at least one vector associated with the at least one virtual node connected to the sub-edge; and
determining the positions of the virtual nodes using the respective vectors associated with the virtual nodes.

15. An apparatus for generating a graphical representation of a graph comprising a plurality of nodes and a plurality of edges, comprising:
means for determining, for each of the nodes of the graph, a position of the node within a layout of the graph;
wherein the positions of the nodes within the layout of the graph are determined using a force model comprising a substantially linear repulsive force in a first region, a substantially exponential repulsive force in a second region, and an attractive force in a third region;
wherein, for each of a plurality of pairs of nodes of the graph for which the force model is used, the region of the force model that is used is determined using a distance between the nodes in the pair of nodes; and
means for generating a graphical representation of the graph using the determined positions of the nodes within the layout of the graph.

16. The apparatus of claim 15, wherein the force model is a first force model, wherein the positions of the nodes within the layout of the graph are determined using the first force model and a second force model, wherein the second force model comprises a substantially linear attractive force.

17. The apparatus of claim 16, wherein each of the nodes of the graph has a vector associated therewith, wherein the means for determining the positions of the within the layout of the graph comprises:
means for determining, for each pair of nodes in the graph, a first force for the node pair using the first force model, and adding the first force to the respective vectors associated with the nodes in the node pair;
means for determining, for each pair of nodes in the graph connected by an edge of the graph, a second force for the node pair using the second force model, and adding the second force to the respective vectors associated with the nodes in the node pair connected by the edge; and
means for determining the positions of the nodes using the respective vectors associated with the nodes.

18. The apparatus of claim 17, wherein the means for determining the positions of the nodes using the respective vectors associated with the nodes comprises:
means for identifying, for each of the nodes, a previous position associated with the node;
means for determining, for each of the nodes, a displacement value for the node using the respective vector for the node; and
means for determining the positions of the nodes by updating the previous positions of the nodes using the respective displacement values of the nodes.

19. The apparatus of claim 18, wherein the means for determining the displacement values for the nodes comprises:
means for dividing, for each of the nodes, the vector associated with the node by a damping parameter.

20. The apparatus of claim 18, further comprising:
means for computing an absolute value of each of the displacement values of the nodes;
means for computing a summation of the absolute values of the displacement values of the nodes; and
means for determining, using the summation of the absolute values, whether the positions of the nodes comprise final positions of the nodes within the layout.

21. The apparatus of claim 15, wherein the substantially linear repulsive force in the first region comprises a substantially constant repulsive force, wherein the substantially exponential repulsive force in the second region decreases with an increase in distance between nodes, wherein the attractive force in the third region increases with an increase in distance between nodes.

22. The apparatus of claim 15, wherein the region of the force model to be used for a pair of nodes is selected according to a distance x between respective centers of the nodes in the pair of nodes.

23. The apparatus of claim 22, wherein the first region is used when the distance x is in a first range $0<x<2r$, wherein the second region is used when the distance x is in a second range $2r<x<2r+d$, wherein the third region is used when the distance x is in a third range $2r+d<x$, wherein r is a radius of each node in the pair of nodes, wherein d is an adjustable parameter.

24. The apparatus of claim 15, further comprising:
means for displaying the graphical representation of the layout of the graph.

25. The apparatus of claim 15, further comprising:
means for determining, for each edge of the graph, a position of the edge within the layout of the graph.

26. The apparatus of claim 25, wherein the means for determining the positions of the edges of the graph, comprises:
means for fixing the positions of the nodes within the layout of the graph;
means for splitting each edge into at least two sub-edges;
means for generating, for each edge, a virtual node between each pair of sub-edges formed from the edge;
means for determining a position of each virtual node within the layout of the graph; and
means for splining, for each edge, the sub-edges formed from the edge using the virtual nodes between each pair of sub-edges formed from the edge.

27. The apparatus of claim 26, wherein the position of each virtual node is determined using the first force model.

28. The apparatus of claim 26, wherein the force model is a first force model, wherein a second force model comprises a substantially linear attractive force, wherein each virtual node has a vector associated therewith, wherein the means for determining the positions of the virtual nodes comprises:
means for determining, for each pair of nodes including at least one virtual node, a first force using the first force model, and adding the first force to the at least one vector associated with the respective at least one virtual node of the node pair;

means for determining, for each of the sub-edges, a second force using the second force model, and adding the second force to the at least one vector associated with the at least one virtual node connected to the sub-edge; and means for determining the positions of the virtual nodes using the respective vectors associated with the virtual nodes.

29. A non-transitory computer readable storage medium storing a software program, that, when executed by a computer, causes the computer to perform a method for displaying a graphical representation of a graph comprising a plurality of nodes and a plurality of edges, the method comprising:

determining, for each of the nodes of the graph, a position of the node within a layout of the graph;
wherein the positions of the nodes within the layout of the graph are determined using a force model comprising a substantially linear repulsive force in a first region, a substantially exponential repulsive force in a second region, and an attractive force in a third region;
wherein, for each of a plurality of pairs of nodes of the graph for which the force model is used, the region of the force model that is used is determined using a distance between the nodes in the pair of nodes; and generating a graphical representation of the graph using the determined positions of the nodes within the layout of the graph.

* * * * *